United States Patent [19]

Comer

[11] 4,410,551
[45] Oct. 18, 1983

[54] GRAVY FORMING INTERMEDIATE MOISTURE PET FOOD

[75] Inventor: Daniel K. Comer, Creve Coeur, Mo.

[73] Assignee: Ralston Purina Company, St. Louis, Mo.

[21] Appl. No.: 450,843

[22] Filed: Dec. 17, 1982

Related U.S. Application Data

[63] Continuation of Ser. No. 150,272, May 15, 1980, abandoned.

[51] Int. Cl.³ ................................................. A23K 1/00
[52] U.S. Cl. ........................................ 426/99; 426/305; 426/307; 426/310; 426/335; 426/532; 426/805
[58] Field of Search ................ 426/99, 305, 307, 302, 426/310, 805, 335, 532

[56] References Cited

U.S. PATENT DOCUMENTS

| | | | |
|---|---|---|---|
| 3,119,691 | 1/1964 | Ludington | 426/805 X |
| 3,389,000 | 6/1968 | Fujita et al. | 426/302 X |
| 3,467,525 | 9/1969 | Hale et. al. | 426/305 X |
| 3,482,985 | 12/1969 | Burgess et al. | 426/805 X |
| 3,982,003 | 9/1976 | Mitchell et al. | 426/805 X |
| 4,104,406 | 8/1978 | Stringer et al. | 426/99 |
| 4,104,407 | 8/1978 | Stringer et al. | 426/99 |
| 4,247,562 | 1/1981 | Bernotavicz | 426/805 X |

*Primary Examiner*—R. B. Penland
*Attorney, Agent, or Firm*—Virgil B. Hill

[57] ABSTRACT

An intermediate moisture pet food is described which forms a gravy-like mixture upon the addition of a warm aqueous liquid. The pet food comprises a particulate mass of a proteinaceous - farinaceous mixture having a moisture content of between about 15–55% by weight which is coated with particles of a fat encapsulated gravy forming material. The fat encapsulated particles of gravy forming materials are resistant to moisture activation during storage but activate to produce a gravy-like mixture upon the addition of a warm aqueous liquid to the pet food.

23 Claims, No Drawings

GRAVY FORMING INTERMEDIATE MOISTURE PET FOOD

This is a continuation of application Ser. No. 150,272, filed May 15, 1980, now abandoned.

BACKGROUND OF THE INVENTION

This invention relates to an intermediate moisture pet food which forms a gravy mixture upon the addition of a warm, aqueous liquid.

Intermediate moisture pet foods generally are classified as having a moisture level between about 15–55% with added antimicrobial materials to stablize and preserve the product during storage. This type of product has had increased acceptance in the pet food market as an alternative to the dry pet food products. While the latter offer the advantage of convenience and a long shelf life, the soft moist products generally are considered to be more palatable because of the higher moisture level. Typical soft moist products and methods for their production are described in U.S. Pat. Nos. 3,852,483; 3,202,514; 3,615,652; 3,653,908; 3,482,985; 3,745,021; 4,011,345 and 4,011,346. All of these represent variations in the materials or means of stabilizing the product and preserving it at ambient conditions over a period of time. Typical moisture levels for products produced in the above patents are between 15 and 55% by weight.

One means of improving the acceptability and palatability of dry pet foods has been to add a dry gravy forming material to the surfaces of the dry pet food. The presence of the material on the dry product presents no storage problems and when the consumer adds an aqueous liquid to the dry product a gravy-like mixture is formed. Typical products of this type are described in U.S. Pat. Nos. 3,119,691; 3,467,525; 4,104,407 and 4,104,406. The gravy forming materials disclosed in the above references generally can be pregelatinized starches, gums, or various other polysaccharides or thickeners. As described in U.S. Pat. No. 3,119,691 these gravy forming ingredients are usually applied to the dried expanded pellet immediately following or together with a fat that is sprayed on the surface of the expanded material. The fat forms a coating on the pet food, and the particles of gravy forming material become available on the surface of the fat coated pellet to quickly form a gravy when an aqueous liquid makes contact with the particles. U.S. Pat. No. 3,467,525 describes a somewhat different process for a gravy forming, dry pet food by a two-stream process in which a portion of the pellets are coated with fat which are then heated to promote fat penetration followed by coating of a separate portion of the pellets with a thickener. The combined mix of pellets provides a thickened mixture upon the addition of an aqueous liquid. U.S. Pat. No. 4,104,406 describes a dry expanded pet food which is first coated with a fat/dextrin emulsion to resist hydration of the expanded particle followed by coating with gravy forming materials. This product is also characterized by the presence of gravy forming materials on the outer surface to provide immediate thickening upon addition of an aqueous liquid. U.S. Pat. No. 4,104,407 is similar except that separate layers of fat and dextrin are provided to prevent extensive hydration of the expanded particle when the gravy is formed.

Intermediate moisture pet foods would likewise have increased appeal to the consumer if a gravy-like mixture could be formed with the pet food upon the addition of an aqueous liquid. Conceptually, an intermediate moisture product with a gravy forming material on the surfaces thereof is difficult to obtain since the gravy forming materials react quickly with any moisture to form a gravy and the presence of 15–55% inherent moisture in a soft moist pet food could activate any thickener applied to the product during storage. This premature activation by the moisture in this type of product makes the addition of a gravy former a difficult task, since the ultimate objective is to produce a product which will retain its appearance during storage but will form a gravy-like mixture only when water has been added by the consumer.

This problem has been overcome in the present invention and accordingly it is an object of the present invention to produce an intermediate moisture pet food which will form a gravy-like mixture upon the addition of an aqueous liquid.

It is also an object of the present invention to produce a gravy forming intermediate moisture pet food that will avoid activation of the gravy forming components by the inherent moisture in the pet food product.

It is a further object to produce a gravy forming intermediate moisture pet food that will retain its gravy forming characteristics during storage without activation by the inherent moisture present in the pet food product.

It is an object to provide an intermediate moisture pet food which will form a gravy-like mixture upon the addition of an aqueous liquid which will be of increased appeal and acceptability to both the consumer and the pet.

SUMMARY OF THE INVENTION

The above objectives are achieved in the present invention by an intermediate moisture pet food which is capable of forming a gravy mixture upon the addition of an aqueous liquid without premature activation of the gravy forming ingredients because of the inherent moisture in the pet food product. This gravy forming pet food comprises a particulate mass of pieces of a proteinaceous and farinaceous mixture having between about 15–55% moisture, which is coated with particles of a fat encapsulated gravy forming material. The fat encapsulated particles of gravy forming materials are resistant to moisture penetration during storage but activate to produce a gravy-like mixture upon the addition of a warm aqueous liquid to the pet food.

The gravy forming ingredients are encapsulated in a fat which is typically solid at ambient temperatures or under the temperature conditions encountered during storage. The fat typically melts at temperatures of 100°–150° F., preferably 110°–130° F., which correlates with the temperature of warm or hot water in most households. The fat that provides the encapsulate for the gravy forming materials is in a relatively uniform and homogeneous layer around the gravy forming materials without any cracks or fissures making the particle resistant to moisture penetration during storage. An essential characteristic of the fat encapsulated gravy forming ingredient of the present invention is the weight ratio of fat relative to the weight ratio of gravy forming ingredients. This weight ratio provides the necessary thickness of the fat layer in order to resist moisture penetration of the gravy forming materials from the soft moist product as well as to allow relatively quick formation of the gravy when the warm water is added to the pet food product by the consumer.

The gravy forming intermediate moisture pet food of the present invention represents a unique breakthrough in pet food production and combines the inherent appeal and palatability of a soft moist product with a gravy forming material which heretofore was considered only to be useful for dry pet foods.

DESCRIPTION OF THE PREFERRED EMBODIMENTS

The product of the present invention comprises an intermediate moisture pet food coated with particles of a fat encapsulated gravy forming material.

The formulation and production of intermediate moisture pet foods are well-known in the art of pet food processing and the present invention is not intended to be limited by specific ingredients that are used to formulate these pet foods or any specific process for producing these pet foods. Accordingly, the concept disclosed in the present invention is intended to apply to any type of intermediate moisture pet foods generally having a moisture range of between about 15–55% by weight without regard to the manner in which it is made or the exact ingredients used in its formulation. Intermediate moisture pet foods having the above moisture range can be produced in several different ways depending on the materials used to achieve shelf stability. For example, if water soluble substances such as sugars and the like are used to decrease the water activity as described in U.S. Pat. No. 3,202,514, a low temperature forming process is usually employed to form the ingredients into a particulate mass.

By contrast, if acids or other materials are used to increase the water activity as is described in U.S. Pat. Nos. 3,852,483 or 4,011,345 without substantial percentages of sugar, conventional extrusion techniques as are employed in the production of dry pet foods are usually employed to produce an expanded soft moist pet food. These techniques involve extrusion of proteinaceous and farinaceous mixtures at temperatures generally above 212° F. and at elevated pressure to achieve vaporization of the moisture from the product when it exits the extruder into a zone of lower pressure. This results in expansion of the mass which can be further subdivided into a particulate mass with the application of flavorings or antimicrobial substances to the surface of the expanded particulate mass.

The preferred means of making an intermediate moisture pet food for purposes of the instant invention is by the extrusion-expansion process generally referred to above. This is the process that is described in more detail for purposes of the present invention although as noted above, the present is not limited by the manner in which the soft moist pet food is produced.

Typically an expanded product of this type having a final moisture of 15–55% by weight will have a proteinaceous ingredient content of between about 10 and 50% by weight of the product and a cereal or farinaceous ingredient content of between about 10 and 50% by weight of the product.

The proteinaceous ingredients can comprise animal or vegetable protein materials including fresh meat or meat by-products if desired. Among the animal protein materials are meat or meat by-products and specifically materials such as liver or glandular meal, meat meal, meat and bone meal, fish meal, poultry meal, blood meal, as well as products derived from milk or eggs.

Fresh meat can include the flesh of cattle, swine, sheep, goats, horses, whales or other mammals, poultry and fish. Included within this are fresh meat by-products such as lungs, spleen, kidneys, brain, livers, blood, fatty tissue, intestines, and the like.

Vegetable proteinaceous ingredients which may be employed include oilseed materials either full fat or defatted including soybean meal, soy flour, soy concentrate, or soy isolate as well as other oilseed materials such as cottonseed meal, safflower or sunflower meal and the like. Also included within this group are various glutens, such as wheat or corn gluten or materials of this type that have a protein level above about 30% by weight.

Microbial protein may also be employed as a proteinaceous ingredient in formulating the pet food of the present invention and included within this generic grouping are various yeast products, such as brewers yeast, torula yeast, or single cell protein.

Typically, no single proteinaceous ingredient is used in formulating pet foods and mixtures of the above general types of protein sources will be employed for nutritional balance, economy and palatability.

Cereal or farinaceous ingredients that can be used in formulating the soft moist pet foods of the present invention include wheat flour, corn flour, oat flour, as well as wheat bran, milo, barley, rice, wheat starch, corn or various other types of starches or cereal grains. These will typically be employed in mixtures, as is the case with the proteinaceous ingredients, since a balancing of these will maximize nutritional balance, economy, and palatability of the pet food.

For illustrative purposes, if one is producing an intermediate moisture pet food of the expanded type, the above proteinaceous and farinaceous ingredients are mixed together with an effective amount of moisture to plasticize the material in the extruder and/or gelatinize the starchy material to permit expansion of the mass upon exit into a zone of atmospheric pressure. Typical moisture levels for extrusion will be between about 12 to 30% by weight of the final product. This level of moisture together with the inherent moisture of the starting materials, the slight amount of moisture picked up during extrusion, plus any added moisture during further processing, represents the total moisture level for the intermediate moisture pet food.

Other materials may be added to the proteinaceous and farinaceous mixture if desired prior to extrusion such as plasticizing agents or humectants to decrease the water activity of the pet food matrix as well as contribute to the texture of the final product. Included within this group of materials are various water soluble substances such as polyhydric alcohols, edible acids or salts, sugars, corn syrup, molasses, and/or anti-mycotics. These materials either individually or collectively contribute to the texture, i.e. softness of the product, or the bacteriological stability either by control of the pH of the pet food matrix or the water activity. In any event, the present invention is not intended to be limited by the exact type of materials that are included in a soft moist pet food to provide shelf stability, since the selection or inclusion of these are within the skill of the art depending on the exact type of product desired.

As an illustration and for general purposes, bacteriological control of the pet food through the addition of an acidic compound will be that amount necessary to reduce the pH to between about 4 to 6 although the exact level can be above or below this depending on other ingredients which might also be used to control water activity. If control of the water activity is the principle means desired of stabilizing the product without a relatively low pH then somewhat higher levels of materials such as sugars, polyhydric alcohols, carbohydrates, salts and the like may be necessary to achieve sufficient stability. In any event, these variations will be readily apparent to one skilled in the art.

An effective amount of an anti-mycotic is also helpful in controlling the product against undesired mold growth and it may be desirable in some instances to include this in the mixture prior to extrusion although usually it is applied to the surface of the product to minimize mold growth problems upon storage.

Other additives, such as minerals, vitamins, coloring and/or flavoring may be added to the mixture to be extruded and these may be added for nutritional balance, appearance of the product or palatability. Suitable amounts and types of these ingredients will be readily apparant to one skilled in the art.

In producing an expanded pet food, the above mixture of proteinaceous and farinaceous materials is conveyed to an extruder that is common to the pet food industry and heated under pressure to temperatures above 212° F., preferably 220° to 250° F. The mixture is then extruded into a region of lower temperature and pressure to result in expansion as the product exits the orifice or die of the extruder into the area of lower pressure. This results in expansion of the material by vaporization of some of the moisture. The rate of extrusion as well as the temperature and pressure may be readily adjusted to achieve the desired density range.

The expanded pet food exits the extruder as a continuous rope and it is common to subdivide this continuous stream of product into a particulate mass of material. These individual pieces of product may then be cooled and/or coated with additional amounts of ingredients such as flavoring, preservatives, anti-mycotics and the like to further assist in maintaining shelf stability of the product. Also other materials such as fat soluble vitamins and/or fats may be added for complete nutritional balance of the product. Any of these may be added prior to or after cooling of the product as desired.

The individual particulate mass or pieces of intermediate moisture pet food are then coated with particles of a fat encapsulated gravy forming material. An effective amount of this material is added to the surfaces of the pet food product so that a thickened gravy-like mixture will result when a warm aqueous liquid is added to the pet food product. Typical amounts of the fat encapsulated material employed are between about 0.25–10% by weight of the pet food product. A preferred level of addition is between about 1 to 4% by weight of the pet food product.

Since the fat encapsulated gravy forming material is a flowable powder, a convenient means of application is by dusting the particles of fat encapsulated material onto the surfaces of the product by a suitable mechanical applicator although other means of applying the material to the surfaces of the pieces of pet food may also be used. It is desirable to maintain the temperature of the pet food product to which the gravy former is added, substantially below the melting point of the fat used to encapsulate the gravy forming ingredients, since this otherwise might result in loss of the fat encapsulate and activation of the gravy forming materials. Therefore, depending on the exact type of fat and its melting point employed in encapsulating the gravy forming materials, it may be necessary to cool the product before application of the coating. If fats having melting point ranges as generally described in the present invention are used to encapsulate the gravy formers, then only a slight amount of cooling of the product is necessary before application of the coating and this will normally be achieved in an air conveyance system as is typically employed in transferance of the product from the extrusion line to the packaging line in a commerical pet food operation. Generally, the temperature of the product before application of the encapsulated coating will be below about 140° F. and usually between 50° and 140° F.

The fat encapsulated gravy forming material comprises a flowable powder in which the fat encapsulates various gravy formers in a uniform non-moisture penetratable layer. The gravy forming materials employed in the present invention include mixtures generally of starches, polysaccharides or thickeners, flavoring and/or coloring. Various materials which can be used to form a gravy for pet food are known to one skilled in the art and include starches such as pregelatinized starches, typically pregelatinized or cooked potato flour, corn, rice, and wheat flour. Other types of pregelatinized starches are also suitable and typical amounts of pregelatinized starches are between about 5 to 50% by weight of the fat encapsulated particle.

It is also desirable to include as part of the gravy forming mixture, various thickeners such as polysaccharides or hydrocolloids included among which are the alginates or alginate derivatives, carrageenins, guar gum, xanthan gum, locust bean gum, and carboxymethylcellulose. These serve to thicken the gravy when the gravy forming material is activated by water and are employed in amounts of between about 0.1 and 50% by weight of the fat encapsulated particle.

Materials which can also be included in the gravy forming materials if desired, include dextrins or starch hydrolysis products, as well as various emulsifiers, flavorings or colorings. Typical flavorings include hydrolyzed vegetable protein, onion or garlic powder. Amounts of these materials will vary depending on the flavor or color of the gravy mixture desired and the exact amount will be readily apparent to one skilled in the art. Typical amounts of coloring and flavoring are between 0.1 and 20% by weight of the fat encapsulated material.

It is also desirable to include in the gravy forming mixture a flow control agent such as silica or the like so the gravy forming powder is maintained in a flowable condition for fat encapsulation. Typical amounts of flow control agent are 0.1 to 5% by weight of the fat encapsulated particle.

The gravy forming mixture which is in the form of a flowable powder is then encapsulated in fat which is typically a solid at ambient or storage temperatures and has a melting point range of between about 100°–150° F. preferably about 110° to 130° F.

A variety of techniques are available for encapsulating the gravy forming material in the fat and the present invention is not intended to be limited by the specific technique for encapsulating the gravy formers. An essential characteristic of the fat encapsulated gravy material employed in the present invention is a weight ratio of fat relative to the weight ratio of gravy forming materials. This weight amount of fat provides a fat layer with the necessary thickness in order to resist moisture penetration yet allows relatively quick formation of the gravy when warm water is added to the pet food product by the consumer.

It is, therefore, necessary that the fat be at least about 20% by weight of the fat encapsulated gravy forming particle, preferably at least about 30% by weight of the particle. This amount of fat provides the necessary thickness to resist moisture penetration and eliminates the need for critical control of the manner in which the coating is applied. Therefore, a typical amount of fat for encapsulating the gravy forming materials is between about 20-60% and preferably between about 25-50% by weight of the fat encapsulated particle. As the level of fat exceeds 60% by weight of the particle, then handling of the particle becomes somewhat difficult.

It is also necessary that the fat layer be relatively uniform, although the above amount of fat insures that the thickness if adequate without critical control of the coating or encapsulation procedure to eliminate non-uniformity in the coating. Certainly, if the fat layer has any cracks of fissures in it, moisture from the pet food product could penetrate the fat layer and activate the gravy formers during storage. Therefore, the amount and type of fat set forth above insures that a uniform layer without cracks or fissures in the coating is achieved without regards to the type of encapsulation procedure employed. It may also be desirable but not essential to apply the required amount of fat in more than one coat to insure a uniform coating. This is especially desirable when the amount of fat exceeds 35% by weight of the particle.

When fat having the above melting point range is employed, it provides a stable or solid layer under most conditions of storage yet melts when hot tap water is added by the consumer to activate the gravy forming material. It is also desirable, but not necessary, to employ a fat without an added hydrophillic emulsifier in the fat since the hydrophillic nature of this type of material will attract moisture depending on the storage conditions and provide a pathway for moisture through the fat layer and to the moisture reactive gravy forming materials encapsulated by the fat layer.

A variety of coating techniques can be used to form the fat encapsulated gravy forming material of the present invention. One suitable technique is to suspend the particles of gravy forming material in a fluidized bed of air and spray a mist of hot fat and air mixture into intimate contact with the suspended particles in order to provide a relatively uniform coating of the fat on the particles. It is also possible to employ an agglomerating tower which creates a whirlpool type effect in the tower and keeps the particles of gravy forming materials in continuous motion. Fat can be misted into the top of the tower and a negative pressure at the opposite end of the tower creates a vortex in the tower for maximum turbulence and mixing of the particles and fat. Either of these techniques provide a satisfactory means of encapsulating the gravy forming ingredients and other techniques of encapsulation will also be apparent to one skilled in the art.

The fat encapsulated particles are then gradually air cooled in order to obtain the most stable crystalline form for the fat. This is commonly referred to as tempering of the fat and involves cooling at temperatures of 110° to 50° F. for times of 10 to 120 minutes.

The pet food product can then be coated with the fat encapsulated gravy former which has been found to be resistant to penetration by moisture in the soft moist product, yet will readily dissolve in warm tap water to form a thickened gravy-like mixture in less than about 0.3-5 minutes.

The following Examples are intended to provide illustrative embodiments of the present invention.

EXAMPLE 1

An expanded soft moist dog food was prepared by mixing the following ingredients:

| Ingredient | % by weight of the product |
| --- | --- |
| Ground Yellow Corn | 5.63% |
| Ground Wheat | 21.53% |
| Soybean Meal (49% protein) | 12.22% |
| Meat and Bone Meal | 15.63% |
| Beef and Bone Meal | 3.10% |
| Fumaric Acid | 1.24% |
| Wheat Germ | 0.72% |
| Animal Fat | 1.26% |
| Vitamins and Minerals | 1.68% |
| Coloring | .02% |
| Flavoring | .03% |
| Potassium Sorbate | 0.44% |

To the above mixture about 3.5% water was added during steam conditioning of the mixture at a temperature of 180°-200° F. This mixture was then extruded at a temperature of 250° F. under conditions of elevated pressure into the atmosphere to produce a continuous rope of an expanded, soft moist pet food product which was subdivided by a rotating knife into individual pieces of soft moist pet food. These prices were then conveyed to a spray chamber where they were sprayed with the following materials and/or mixtures in the indicated order.

| Ingredient | % by weight of the Product |
| --- | --- |
| Mixture No. 1 | |
| Animal Fat | 5.97% |
| Propylene Glycol | 1.00% |
| Vitamins & Flavoring | .02% |
| Glycerol Monostearate | .10% |
| Sorbic Acid | .28% |
| Mixture No. 2 | |
| Phosphoric Acid | 1.00% |
| Sugar | 4.59% |
| Water | 20.04% |

The resulting expanded, soft moist dog food product had a moisture content of about 36% by weight.

A gravy forming mixture was separately produced by blending the following ingredients:

| Ingredient | % by weight of the fat coated particle |
| --- | --- |
| Pregelatinized Starch | 23.20% |
| Sodium Alginate | 23.20% |
| Hydrolyzed Vegetable Protein | 16.00% |
| Flavoring and Coloring | 6.70% |

The above mixture was encapsulated in a Uni-Glatt ® granulating unit manufactured by Glatt GmbH, Binzen/Lörrach (BRD) Germany at a temperature of 140° F. by employing the following encapsulating mixture which was preheated to a temperature of 160° F. for encapsulation of the gravy forming mixture.

| Ingredient | % by weight of the fat coated particle |
|---|---|
| Hydrogenated Fat (m.p. 115–120° F.) | 16.0% |
| Hydrogenated Fat (m.p. 124–130° F.) | 14.3% |
| Polyglycerol mono ester | 0.5% |
| Propionic Acid | 0.1% |
| Sorbic Acid | 0.1% |

The fat encapsulated, gravy forming mixture was cooled to ambient temperature followed by screening of the encapsulated mixture through a 20-40 mesh screen. 2% by weight of the encapsulated gravy forming mixture was dusted on the expanded soft moist product. When about 2 parts by weight of the coated, expanded soft moist dog food was combined with 1 part by weight of water at 140° F., a desirable brownish gravy was formed with the product.

EXAMPLE 2

A two particle, expanded soft moist cat food was prepared by the following procedure. A basal mixture was entirely formed from the following ingredients:

| Basal Mixture | |
|---|---|
| Ingredient | % by weight of the Basal Mixture |
| Ground Yellow Corn | 16.3% |
| Corn Gluten Meal | 21.0% |
| Soybean Meal (49% Protein) | 14.0% |
| Wheat Flour | 11.7% |
| Poultry Meal | 26.7% |
| Brewers Yeast | 3.0% |
| Dried Whey | 0.25% |
| Minerals & Vitamins | 6.60% |

A portion of the above basal mixture was used as an ingredient to form both a chicken flavored and a tuna flavored mixture. Each of the mixtures were then separately extruded to form a soft moist cat food consisting of a chicken flavored particle and a tuna flavored particle.

| Ingredient | % by weight of the Mixture |
|---|---|
| Chicken Flavored Mixture | |
| Basal Mixture | 79.7% |
| Whole Chicken | 14.0% |
| Propylene Glycol | 5.0% |
| Wheat Germ | 0.75% |
| Coloring | 0.08% |
| Minerals | 0.47% |
| Tuna Flavored Mixture | |
| Basal Mixture | 79.88% |
| Ground Whole Chicken | 9.0% |
| Tuna Solubles | 5.0% |
| Propylene Glycol | 5.0% |
| Coloring | .05% |
| Wheat Germ | 0.75% |
| Minerals & Vitamins | 0.32% |

Each of the above mixtures was then separately extruded at a temperature of 250° F. under conditions of elevated pressure into the atmosphere to produce a continuous rope of an expanded soft moist pet food product which was subdivided by a rotating knife into individual pieces of soft moist pet food. Equal amounts of the tuna flavored and chicken flavored piece, each piece representing 35.12% by weight of the final product were conveyed to a spray chamber and sprayed with the following mixture:

| Ingredient | % by weight of the Final Product |
|---|---|
| Phosphoric Acid | 2.25% |
| Animal Fat | 5.5% |
| Propylene Glycol | 5.0% |
| Water | 17.0% |
| Vitamins | .01% |

The resulting expanded two particle soft moist cat food product has a moisture content of 30% by weight.

A gravy forming mixture was separately produced by blending the following ingredients.

| Ingredient | % by weight of the Fat Coated Particle |
|---|---|
| Pregelatinized starch | 23.2% |
| Sodium Alginate | 23.2% |
| Hydrolyzed Vegetable Protein | 16.0% |
| Flavoring and Coloring | 6.7% |

The above mixture was encapsulated in a Uni-Glatt ® granulating unit manufactured by Glatt GmbH, Binzen/Lörrach (BRD) Germany at a temperature of 140° F. by employing the following encapsulating mixture which was then preheated to a temperature of 160° F. for encapsulation of the gravy forming mixture.

| Ingredient | % by weight of the Fat Coated Particle |
|---|---|
| Hydrogenated Fat (m.p. 115–120° F.) | 16.0% |
| Hydrogenated Fat (m.p. 124–130° F.) | 14.3% |
| Polyglycerol Mono ester | 0.5% |
| Propionic Acid | 0.1% |
| Sorbic Acid | 0.1% |

The fat encapsulated gravy forming mixture was cooled to ambient temperature, followed by screening of the encapsulated mixture through a 20-40 mesh screen. 2% by weight of the product of the encapsulated gravy forming mixture was dusted on the expanded soft moist product. When about 2 parts by weight of the coated expanded soft moist cat food was combined with 1 part by weight of water at 140° F., a desirable brownish gravy was formed which covered the pieces of expanded soft moist pet food.

EXAMPLE 3

A gravy forming mixture was produced by blending the following ingredients:

| Ingredient | % by weight of the Fat Coated Particle |
|---|---|
| Pregelatinized starch | 21.4% |
| Hydrolyzed vegetable protein | 21.4% |
| Corn dextrin | 21.4% |
| Xanthan gum | 9.0% |
| Beef Flavoring | 6.4% |
| Distilled Monoglyceride | 1.3% |

The above mixture was encapsulated in a Uni-Glatt ® granulating unit manufactured by Glatt GmbH, Binzen/Lörrach (BRD) Germany at a temperature of 140° F. by employing 19.1% by weight of the particle of an encapsulating fat having a melting point range of 115°–120° F. which was preheated to 160° F. before spraying on the gravy forming mixture. Following coating of the gravy forming particles, the temperature is gradually reduced to ambient over a 30 minute period to uniformly temper the fat coating and prevent the formation of any cracks or fissures in the solidified fat.

The fat encapsulated granules were dusted at a level of 3% by weight onto the expanded soft moist dog food produced in accordance with Example 1. When 2 parts by weight of the dusted soft moist dog food were combined with 1 part of water at a temperature of 140° F., a brownish-gray-like mixture was formed which coated the pieces of expanded soft moist pet food.

The fat encapsulated granules were also dusted at a level of 1% by weight onto a portion of the expanded soft moist dog food product produced in accordance with Example 1. When 2 parts by weight of the dusted soft moist products were combined with 1 part of 140° F. water, a desirable brownish-gray was formed which coated the pieces of soft moist dog food.

To evaluate the effectiveness of the encapsulated gravy forming mixture of the present invention in resisting moisture penetration during storage, and premature activation of the gravy, a storage test was conducted.

Samples of the soft moist dog food dusted with 1% and 3% by weight of the encapsulated gravy forming mixture were packaged in standard paper bags for soft moist food which were lined with oriented polypropylene. A portion of the soft moist pet food which was not coated with the encapsulated gravy mixture was packaged in a comparable manner.

Samples of all three products were stored at a temperature of 120° F. for a period of 3 weeks and also at a temperature of 100° F. for 12 weeks. Following storage, the products were examined for any activation of the gravy forming mixture.

Insofar as the samples stored at 120° F. and 100° F. all samples showed a significant amount of condensation inside of the bag. The samples dusted with the encapsulated gravy forming mixture showed a slight amount of clumping as compared to the sample without the control, but significant activation of the gravy forming mixture by the condensed moisture was avoided.

When warm tap water was added to the samples coated with the encapsulated gravy forming mixture, a desirable brownish-gray was produced which was comparable in appearance to the gravy formed by these samples prior to storage. It is, therefore, apparent that the soft moist pet food of the present invention coated with the encapsulated gravy forming mixture significantly resisted moisture penetration and premature activation of the gravy mixture during storage.

EXAMPLE 4

A gravy forming mixture was produced by blending the following ingredients:

| Ingredient | % by weight of the Fat Coated Particle |
|---|---|
| Hydrolyzed Vegetable Protein | 17.22% |
| Pregelatinized Starch | 17.22% |
| Xanthan Gum | 7.1% |
| Distilled Monoglyceride | 1.04% |
| Flavoring | 5.2% |

-continued

| Ingredient | % by weight of the Fat Coated Particle |
|---|---|
| Corn Dextrin | 17.22% |

The above mixture was encapsulated in a Uni-Glatt® granulating unit manufactured by Glatt GmbH/Binzen Lörrach (BRD) Germany at a temperature of 140° F. with 25% by weight of the particle of a hydrogenated fat preheated to 160° F. and having a melting point range of 115°–120° F.

The above particle was cooled to about 70° F. and screened through a 20–40 mesh screen. The particles were again placed in the Uni-Glatt® granulator at a temperature of 140° F. and coated with 10% by weight of the particle of a hydrogenated fat preheated to 160° F. and having a melting point range of 115°–120° F.

The encapsulated gravy forming material having a double coating was then dusted on the two flavored particle soft moist cat food set forth in Example 2 and upon the addition of warm water, formed a brownish colored, desirable looking gravy covering the particles of soft moist pet food.

EXAMPLE 5

A soft moist pet food generally produced in accordance with U.S. Pat. No. 3,202,514 was dusted with 2% by weight of the encapsulated gravy forming mixture set forth in Example 4. The product containing the encapsulated gravy mixture was stored at room temperature for a period of a week in sealed plastic containers. At the end of the week, the pet food product showed no evidence of the gravy forming components being activated during storage. The product at the end of the one week was mixed with hot tap water at an approximate temperature of 130° F. and a thick brownish gravy was formed.

EXAMPLE 6

A pet food product generally produced in accordance with U.S. Pat. No. 4,011,346 having a moisture level of 50% by weight was coated with 2% by weight of the encapsulated gravy forming mixture set forth in Example 4. The coated product was stored in sealed plastic containers for one week at room temperature. At the end of the week, the pet food product showed no evidence of the gravy forming components being activated by the moisture in the product. The coated product at the end of the weeks storage was mixed with hot tap water at an approximate temperature of 130° F. and made a thick, rich gravy covering the pieces of pet food.

While the present invention has been described with reference to specific but preferred embodiments, it is to be understood that various changes and equivalent substitutions may be made without departing from the spirit and scope of the present invention. In addition, many modifications may be made to adapt a particular situation or material to the teaching of the invention without departing from its essential teachings.

What is claimed is:

1. An intermediate moisture pet food comprising a microbiologically stabilized proteinaceous-farinaceous mixture having about 15–55% by weight of moisture, coated with about 0.25–10% by weight of particles of a fat encapsulated gravy forming material, said particles being resistant to moisture penetration during storage but producing a gravy upon the addition of an aqueous liquid to the pet food, said particles containing from about 20% to about 60% by weight fat.

2. The pet food of claim 1 wherein said fat is solid at ambient temperature and has a melting point range of between about 100°–150° F.

3. The pet food of claim 2 wherein said fat has a melting point range of between about 110°–130° F.

4. The pet food of claim 1 wherein said fat comprises at least about 30% by weight of said particles.

5. The pet food of claim 1 wherein said proteinaceous-farinaceous mixture is coated with between about 1–4% by weight particles.

6. The pet food of claim 1 wherein the gravy forming material includes a flow control agent in an amount of about 0.1 to 5% by weight of said particles.

7. The pet food of claim 6 wherein the gravy forming material includes a flow control agent in an amount of about 0.1 to 5% by weight of said particles.

8. The pet food of claim 1 wherein the gravy forming material comprises about 5–50% by weight of said particle of pregelatinized starch and about 0.1–50% by weight of said particle of polysaccharide thickener.

9. The pet food of claim 1 wherein the intermediate moisture pet food has a pH of between about 4 and 6, and includes an antimicrobial agent together with an effective amount of an antimycotic.

10. The pet food of claim 1 wherein said mixture comprise between about 10–50% by weight of a proteinaceous material and about 10–50% by weight of a farinaceous material.

11. An intermediate moisture pet food comprising a microbiologically stabilized proteinaceous-farinaceous mixture having about 15–55% by weight of moisture, coated with particles of a fat encapsulated gravy forming material in an amount effective to form a gravy upon the addition of an aqueous liquid, said particles being resistant to moisture penetration during storage and containing from about 20% to about 60% by weight fat.

12. The pet food of claim 11 wherein said fat is solid at ambient temperature and has a melting point range of between about 100°–150° F.

13. The pet food of claim 11 wherein said proteinaceous-farinaceous mixture is expanded.

14. A process for producing an intermediate moisture pet food comprising:

(a) forming a microbiologically stabilized mixture of proteinaceous and farinaceous materials and 15–55% by weight of moisture;

(b) extruding said mixture under conditions to form an extruded mass; and (c) applying to said extruded mass particles of a fat encapsulated gravy forming material in an amount effective to form a gravy upon the addition of an aqueous liquid, said particles being resistant to moisture penetration during storage and containing from about 20% to about 60% by weight fat.

15. The process of claim 14 wherein said fat is solid at ambient temperature and has a melting point range of between about 110°–150° F.

16. The process of claim 15 wherein said fat has a melting point range of between about 110°–130° F.

17. The process of claim 14 wherein said fat comprises at least about 30% by weight of said particles.

18. The process of claim 14 wherein said extruded mass is coated with between about 0.25–10% by weight particles.

19. The process of claim 18 wherein said extruded mass is coated with between about 1–4% by weight particles.

20. A process for producing an intermediate moisture pet food comprising:

(a) forming a mixture of proteinaceous and farinaceous materials and 15 to 55% by weight of moisture;

(b) extruding said mixture under conditions of elevated pressure and a temperature above about 212° F. to form an expanded, extruded mass;

(c) microbiologically stabilizing the extruded mass; and (d) applying to said extruded mass, particles of a fat encapsulated gravy forming material in an amount effective to form a gravy upon the addition of an aqueous liquid, said particles being resistant to moisture penetration during storage and containing from about 20% to about 60% by weight fat.

21. The process of claim 20 wherein said extruded mass is coated with between about 0.25–10% by weight particles.

22. The process of claim 21 wherein said extruded mass is coated with between about 1–4% by weight particles.

23. The process of claim 20 wherein said fat is solid at ambient temperatures and has a melting point range of between about 100°–150° F.

* * * * *